United States Patent
Hattori et al.

(10) Patent No.: US 12,237,749 B2
(45) Date of Patent: Feb. 25, 2025

(54) MOTOR UNIT

(71) Applicant: Nidec Corporation, Kyoto (JP)

(72) Inventors: Takashi Hattori, Kyoto (JP); Toshiya Okamoto, Kyoto (JP); Daiki Kato, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 252 days.

(21) Appl. No.: 18/084,651

(22) Filed: Dec. 20, 2022

(65) Prior Publication Data

US 2023/0208247 A1    Jun. 29, 2023

(30) Foreign Application Priority Data

Dec. 28, 2021    (JP) .................................. 2021-214279

(51) Int. Cl.
*H02K 5/22*    (2006.01)
*H02K 11/33*    (2016.01)

(52) U.S. Cl.
CPC ............ *H02K 5/225* (2013.01); *H02K 11/33* (2016.01)

(58) Field of Classification Search
CPC ............................... H02K 5/225; H02K 11/33
USPC ......................................................... 310/68 R
See application file for complete search history.

(56) References Cited

U.S. PATENT DOCUMENTS

| | | | |
|---|---|---|---|
| 8,471,418 B2 | 6/2013 | Yamasaki | |
| 2019/0341749 A1* | 11/2019 | Ogawa | H02K 3/522 |
| 2020/0007010 A1* | 1/2020 | Shirai | H02K 11/215 |
| 2020/0099270 A1* | 3/2020 | Kato | F16H 61/32 |
| 2020/0106335 A1* | 4/2020 | Shirai | H02K 7/075 |
| 2020/0251949 A1* | 8/2020 | Onishi | B23K 26/22 |
| 2020/0251951 A1* | 8/2020 | Kinjo | H02K 7/003 |
| 2020/0336040 A1* | 10/2020 | Kume | H02K 5/04 |
| 2021/0288561 A1* | 9/2021 | Kato | H02K 21/16 |
| 2021/0305853 A1* | 9/2021 | Takahashi | H02K 3/522 |
| 2021/0384798 A1* | 12/2021 | Shirai | H02K 11/33 |
| 2022/0037967 A1* | 2/2022 | Yamaguchi | H02K 11/33 |
| 2022/0224195 A1* | 7/2022 | Matsuda | H02K 9/227 |
| 2022/0416625 A1* | 12/2022 | Inuzuka | A01D 34/6806 |
| 2024/0258863 A1* | 8/2024 | Kataoka | H02K 1/16 |
| 2024/0322621 A1* | 9/2024 | Lee | H02K 1/12 |

\* cited by examiner

*Primary Examiner* — Rashad H Johnson
(74) *Attorney, Agent, or Firm* — Keating & Bennett, LLP

(57) ABSTRACT

A motor assembly includes a motor, a controller on one side in an axial direction of the motor, and a motor cover between the motor and the controller in the axial direction. The controller includes a screw. The screw includes a head portion located on one side in the axial direction of the motor cover and a screw portion extending from the head portion to the one side in the axial direction. The motor cover opposes the head portion in the axial direction. A length of the screw in the axial direction is longer than a distance between the controller and the motor cover in the axial direction. The motor includes a pin extending to the one side in the axial direction. The motor cover includes a hole portion into which the pin is inserted. The screw is at a position shifted from the hole portion as viewed in the axial direction.

6 Claims, 8 Drawing Sheets

MOTOR UNIT

CROSS-REFERENCE TO RELATED APPLICATIONS

The present application claims priority under 35 U.S.C. § 119 to Japanese Patent Application No. 2021-214279, filed on Dec. 28, 2021, the entire contents of which are hereby incorporated herein by reference.

FIELD OF THE INVENTION

The present invention relates to a motor assembly.

BACKGROUND

A conventional motor assembly includes a motor and a control board that controls the motor. The control board is fixed with screws.

When a screw to fix the control board is loosened and falls off, the fixation of the control board becomes insufficient, and the vibration generated in the control board increases.

SUMMARY

A motor assembly according to an example embodiment of the present invention includes a motor including a rotor rotatable about a central axis and a stator radially opposing the rotor, a controller on one side in an axial direction of the motor to control the motor, and a motor cover between the motor and the controller in the axial direction and covering the motor from the one side in the axial direction. The controller includes a screw. The screw includes a head portion located on the one side in the axial direction of the motor cover, and a screw portion extending from the head portion to the one side in the axial direction. The motor cover opposes the head portion in the axial direction. An axial length of the screw is longer than a distance between the controller and the motor cover in the axial direction. The motor includes a pin extending to one side in the axial direction. The motor cover includes a hole portion into which the pin is inserted. The screw is at a position shifted from the hole portion when viewed from the axial direction.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present invention will be described with reference to the accompanying drawings.

In the present specification, a direction in which a central axis CA of a motor 1 extends is referred to as an "axial direction", and one side and the other side in the axial direction are respectively defined as an upper side and a lower side. However, the definitions of upper and lower sides do not limit the orientation and positional relationship when a motor assembly 100 is used.

In addition, in the present specification, a radial direction centered on the central axis CA is simply referred to as a "radial direction", a direction approaching the central axis CA in the radial direction is simply referred to as a "radially inside", and a direction away from the central axis CA is simply referred to as a "radially outside". A circumferential direction centered on the central axis CA is simply referred to as a "circumferential direction".

Figure 1:
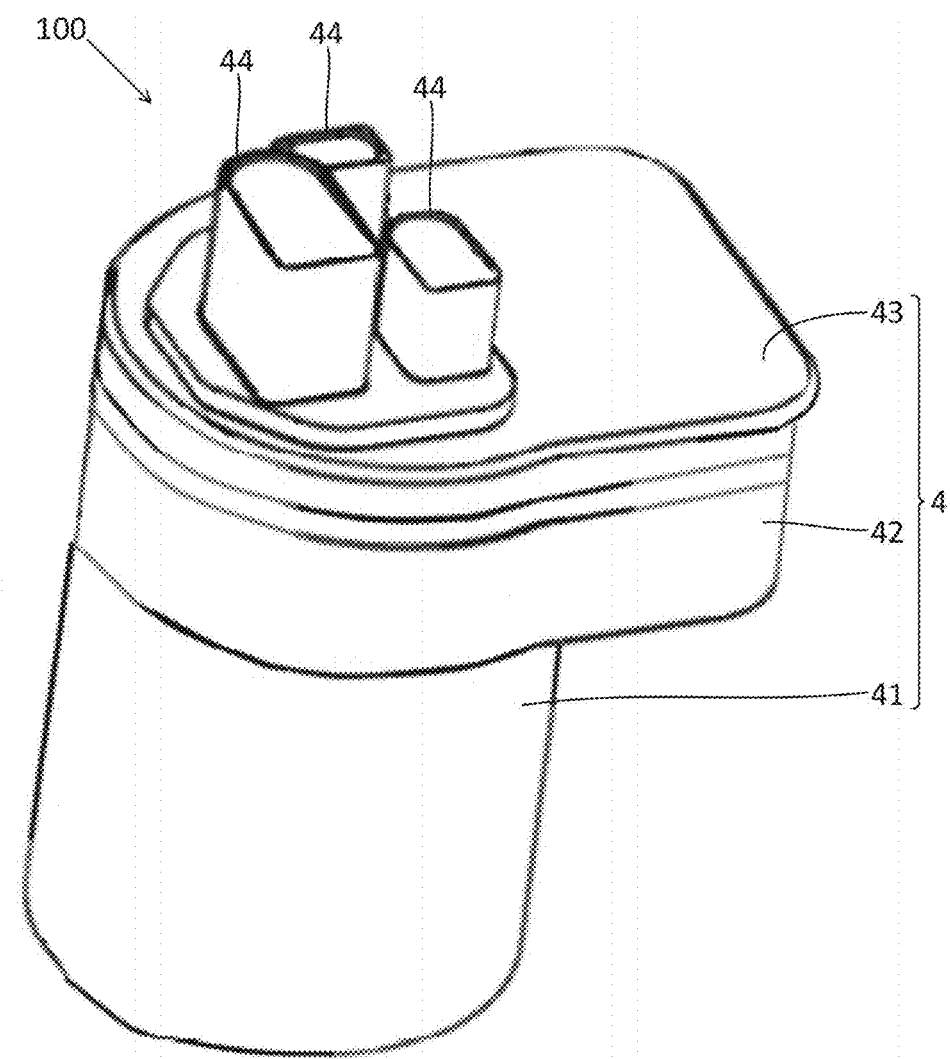
FIG. 1 is a perspective view of a motor assembly according to an example embodiment of the present disclosure.
Figure 2:
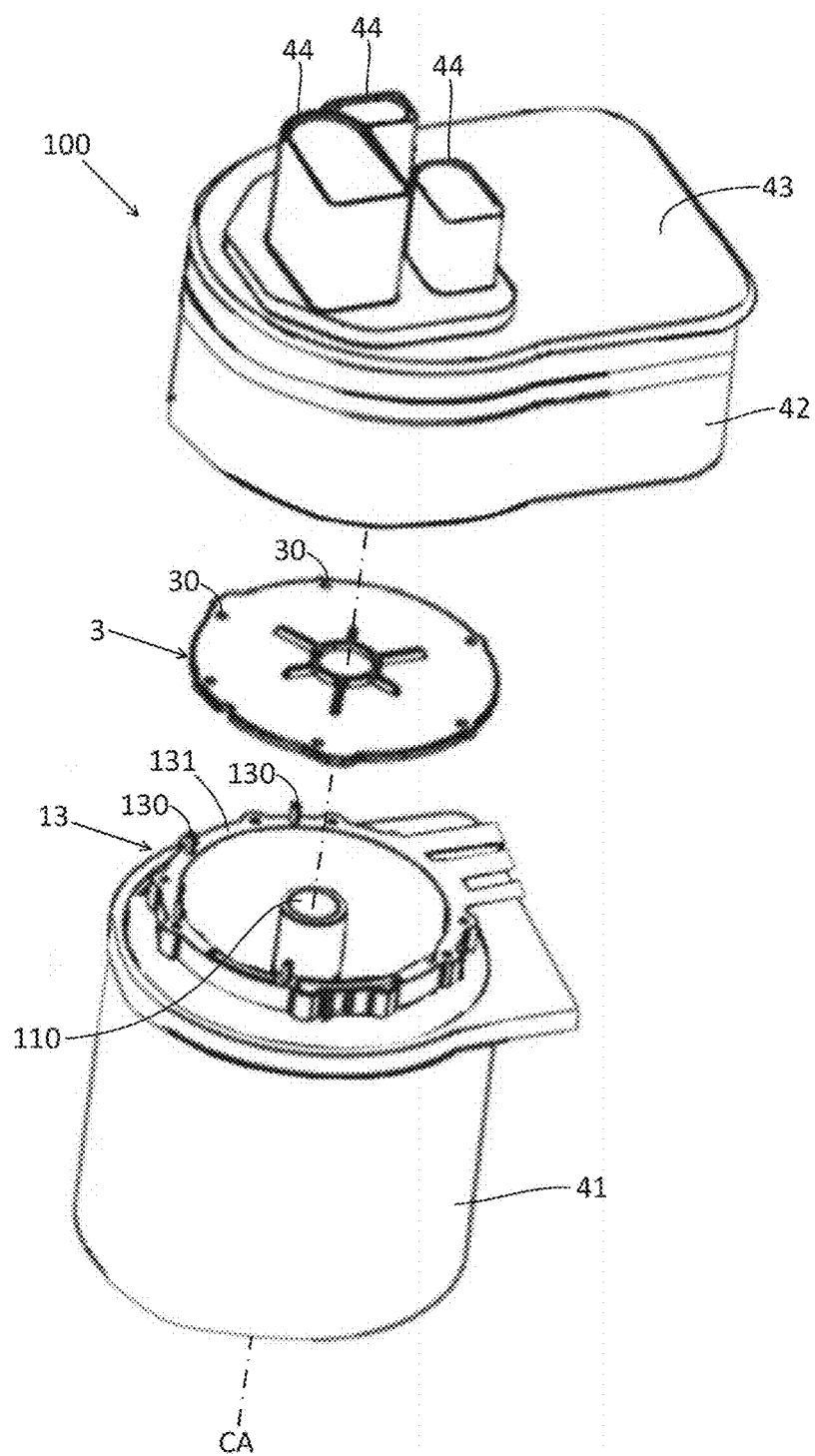
FIG. 2 is an exploded perspective view of a motor assembly according to an example embodiment of the present disclosure.
Figure 3:
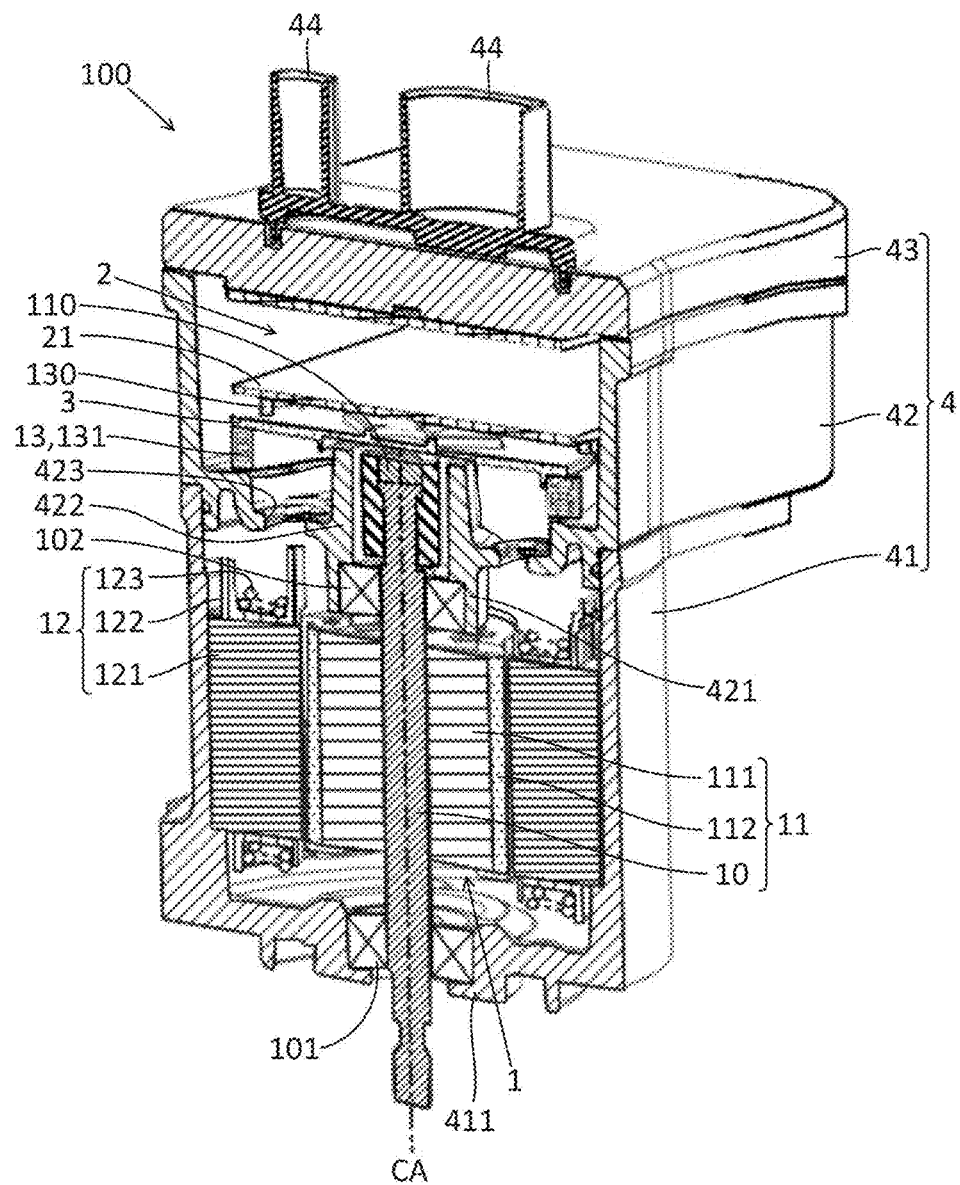
FIG. 3 is a longitudinal cross-sectional perspective view of a motor assembly according to an example embodiment of the present disclosure.
Figure 4:
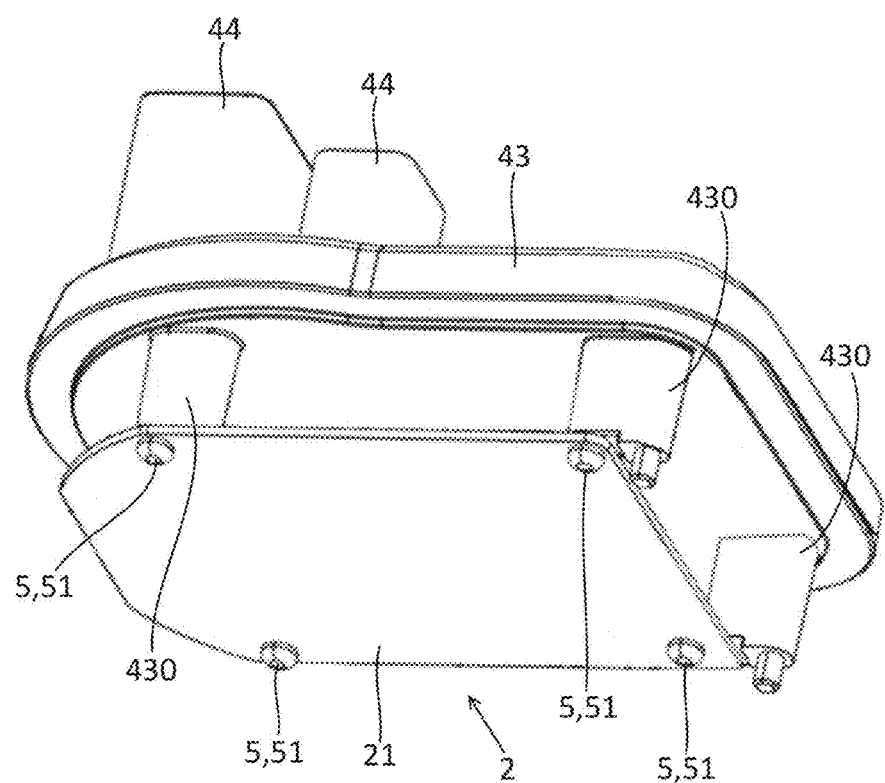
FIG. 4 is a perspective view of a control board according to an example embodiment of the present disclosure as viewed from below.

FIG. 1 is a perspective view of the motor assembly 100 according to an example embodiment. FIG. 2 is an exploded perspective view of the motor assembly 100 according to the example embodiment. FIG. 3 is a longitudinal cross-sectional perspective view of the motor assembly 100 according to the example embodiment. FIG. 4 is a perspective view of a control board 21 according to the example embodiment as viewed from below.

The motor assembly 100 according to the present example embodiment includes the motor 1, a controller 2, and a motor cover 3. The motor assembly 100 includes a housing 4. The motor 1, the controller 2, and the motor cover 3 are housed in the housing 4.

The motor 1 includes a rotor 11 and a stator 12. The rotor 11 is rotatable about the central axis CA. The stator 12 radially faces the rotor 11. The motor 1 includes a bus bar unit 13.

The rotor 11 has a shaft 10. The shaft 10 extends in the axial direction along the central axis CA. The shaft 10 is rotatably supported by a lower bearing 101 and an upper bearing 102. The lower bearing 101 supports the lower side of the shaft 10, and the upper bearing 102 supports the upper side of the shaft 10. The shaft 10 forms the rotation shaft of the motor 1.

The rotor 11 includes a rotor core 111 and a rotor magnet 112. The rotor core 111 has a cylindrical shape extending in the axial direction. The rotor core 111 is formed by stacking a plurality of electromagnetic steel plates in the axial direction. The shaft 10 is press-fitted into the rotor core 111. As a result, the rotor core 111 is rotatable together with the shaft 10. A plurality of rotor magnets 112 are fixed to the radially outer surface of the rotor core 111. The plurality of rotor magnets 112 are arranged along the circumferential direction.

The stator 12 is disposed radially outside the rotor 11 and rotates the rotor 11. The stator 12 includes a stator core 121, an insulator 122, and a coil 123. The stator core 121 has an annular shape centered on the central axis CA. The stator core 121 is formed by stacking a plurality of electromagnetic steel plates in the axial direction. The rotor 11 is disposed radially inside the stator core 121.

The insulator 122 covers at least a part of the stator core 121. The insulator 122 is an insulating member using resin or the like. The coil 123 is formed by winding a conductive wire around the stator core 121 through the insulator 122. The coil 123 is connected to the bus bar unit 13. The bus bar unit 13 supplies drive power to the coil 123.

The bus bar unit 13 is disposed above the stator 12. The bus bar unit 13 includes a bus bar holder 131. The bus bar holder 131 holds a bus bar (not illustrated) of each of the U, V, and W phases. The bus bar of each phase is connected to the coil 123 of a corresponding one of the phases. The bus bar of each phase is connected to the controller 2.

The bus bar unit 13 has a pin 130 extending upward. The pin 130 extends upward from the upper surface of the bus bar holder 131. The bus bar unit 13 is a constituent element of the motor 1. That is, the motor 1 has the pin 130 extending upward (to one side in the axial direction).

For example, the bus bar held by the bus bar holder 131 has an arc shape when viewed from the axial direction. The bus bar holder 131 has an annular portion centered on the central axis CA in order to hold the arc-shaped bus bar. The pin 130 is disposed in the annular portion of the bus bar holder 131. The number of installed pins 130 is plural. The plurality of pins 130 are arranged in the circumferential direction.

The pin 130 has, for example, a columnar shape extending in the axial direction. However, the shape of the pin 130 is not particularly limited. The number of installed pins 130 is also not particularly limited. The pin 130 may be the same member as the bus bar holder 131, or may be retrofitted to the bus bar holder 131.

The controller 2 controls the motor 1. For example, the controller 2 controls power supply to the motor 1. The controller 2 is on the upper side (one side in the axial direction) of the motor 1. The controller 2 includes a control board 21 disposed above the motor 1. The control board 21 expands in the radial direction.

For example, a sensor magnet 110 is disposed at the upper end portion of the shaft 10. The sensor magnet 110 is a permanent magnet and has an N pole and an S pole. The sensor magnet 110 rotates together with the shaft 10. That is, the sensor magnet 110 rotates together with the rotor 11.

A sensor (not illustrated) is on the lower surface of the control board 21. The sensor detects the rotational position of the rotor 11 based on the magnetic flux of the sensor magnet 110. Power supply to the coil 123 is controlled based on the rotational position of the rotor 11.

The motor cover 3 is between the motor 1 and the controller 2 in the axial direction and covers the motor 1 from the upper side (one side in the axial direction). More specifically, the motor cover 3 is disposed to face the lower surface of the control board 21 at an interval in the axial direction. The motor cover 3 is fixed to an upper end portion of the bus bar unit 13. That is, the motor cover 3 covers the bus bar unit 13 from above. By disposing the motor cover 3 between the motor 1 and the controller 2 in the axial direction, it is possible to suppress the adhesion of foreign matters such as dust to the bus bar unit 13. As a result, it is possible to suppress the mixing of foreign matters into the motor 1. The shape of the motor cover 3 will be described in detail later.

The housing 4 includes a motor housing 41, a bearing holder 42, and an upper cover 43.

The motor housing 41 has a bottomed tubular shape. That is, the motor housing 41 has a bottom portion extending in the radial direction. The bottom portion of the motor housing 41 has a through-hole penetrating the axial central portion in the axial direction. The rotor 11 and the stator 12 are disposed radially inside the motor housing 41. The lower end portion of the shaft 10 protrudes downward from the bottom portion of the motor housing 41, and the upper end portion of the shaft 10 protrudes upward from the upper opening of the motor housing 41.

The motor housing 41 has a lower bearing holding portion 411 at the central portion in the radial direction. The lower bearing holding portion 411 is a portion recessed downward from the bottom surface of the motor housing 41. The lower bearing holding portion 411 holds the lower bearing 101. More specifically, the lower bearing 101 is disposed inside the recess constituting the lower bearing holding portion 411.

The motor housing 41 has a tubular portion. The tubular portion of the motor housing 41 extends upward from the radially outer end portion of the bottom portion. The tubular portion of the motor housing 41 covers the rotor 11 and the stator 12 from radially outside.

The bearing holder 42 has a bottomed tubular shape. That is, the bearing holder 42 has a bottom portion that expands in the radial direction. The bottom portion of the bearing holder 42 has a through-hole penetrating the axial central portion in the axial direction. The bus bar unit 13 and the control board 21 are disposed radially inside the bearing holder 42.

The bearing holder 42 has an upper bearing holding portion 421 at the central portion in the radial direction. For example, a lower tubular portion that is a cylindrical portion centered on the central axis CA is provided at the bottom of the bearing holder 42. The lower tubular portion extends downward from the bottom portion of the bearing holder 42. The upper bearing holding portion 421 is formed of a lower tubular portion. The upper bearing holding portion 421 holds the upper bearing 102. More specifically, the upper bearing 102 is disposed inside the lower tubular portion constituting the upper bearing holding portion 421.

The bearing holder 42 further includes a magnet accommodation portion 422 at the center in the radial direction. For example, an upper tubular portion that is a cylindrical portion centered on the central axis CA is provided at the bottom of the bearing holder 42. The upper tubular portion extends upward from the bottom portion of the bearing holder 42. The magnet accommodation portion 422 is configured by an upper tubular portion. The sensor magnet 110 is disposed inside the magnet accommodation portion 422.

The bearing holder 42 has a through-hole 423 penetrating the bottom portion in the axial direction. The conductive wire of the coil 123 extends through the through-hole 423. The conductive wire of the coil 123 is drawn out from the lower side to the upper side of the bottom portion of the bearing holder 42 and is connected to the bus bar unit 13.

The bearing holder 42 has a tubular portion. The tubular portion of the bearing holder 42 extends upward from the radially outer end portion of the bottom portion. The tubular portion of the bearing holder 42 covers the bus bar unit 13 and the control board 21 from radially outside. The tubular portions of the motor housing 41 and the bearing holder 42 are coupled in the axial direction.

The motor cover 3 is between the bus bar unit 13 and the control board 21 in the axial direction. That is, the motor cover 3 is disposed radially inside the bearing holder 42.

The upper cover 43 covers the upper opening of the bearing holder 42 from above. That is, the upper cover 43 is fixed to the upper end portion of the tubular portion constituting the bearing holder 42. For example, the controller 2 includes a connector pin (not illustrated). The connector pin penetrates the upper cover 43 in the axial direction and protrudes to the upper side of the upper cover 43. The tubular portion 44 extending upward in a tubular shape is provided on the upper surface of the upper cover 43. The tubular portion 44 surrounds the connector pin protruding upward from the upper cover 43.

The upper cover 43 has an attachment portion 430 protruding downward from the lower surface. The attachment portion 430 is a screw boss. That is, the attachment portion 430 includes a female screw portion (not illustrated) extending in the axial direction. The number of attachment portions 430 is plural. The attachment portion 430 may be the same member as the upper cover 43 or may be retrofitted to the upper cover 43.

In addition, the controller 2 includes a screw 5. The screw 5 is used for fixing the control board 21. The control board 21 is attached to the attachment portion 430 using the screw 5. More specifically, the control board 21 has an attachment hole 210 (see FIGS. 9 and 10) penetrating in the axial direction. The screw 5 is inserted into the attachment hole 210 of the control board 21 from below and is screwed into the female screw portion of the attachment portion 430. As a result, a head portion 51 of the screw 5 protrudes downward from the lower surface of the control board 21. A plurality of screws 5 are used to attach the control board 21. For example, the number of screws 5 used is four. That is, the number of attachment portions 430 installed is four.

In this case, the motor cover 3 is disposed below the control board 21. Accordingly, when the control board 21 is attached, the head portion 51 of the screw 5 faces the motor cover 3. That is, the screw 5 has the head portion 51 located on the upper side (one side in the axial direction) of the motor cover 3. In addition, the screw 5 has a screw portion 52 (see FIGS. 9 and 10) extending upward (one side in the axial direction) from the head portion 51. The screw portion 52 is a male screw.

Figure 5:
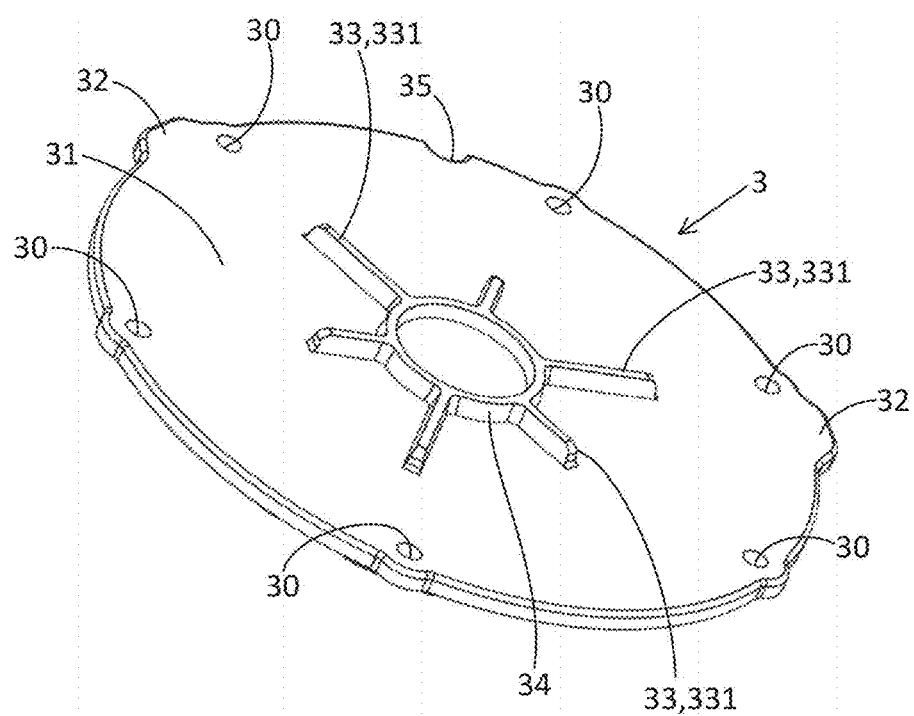
FIG. 5 is a perspective view of a motor cover according to an example embodiment of the present disclosure as viewed from above.
Figure 6:
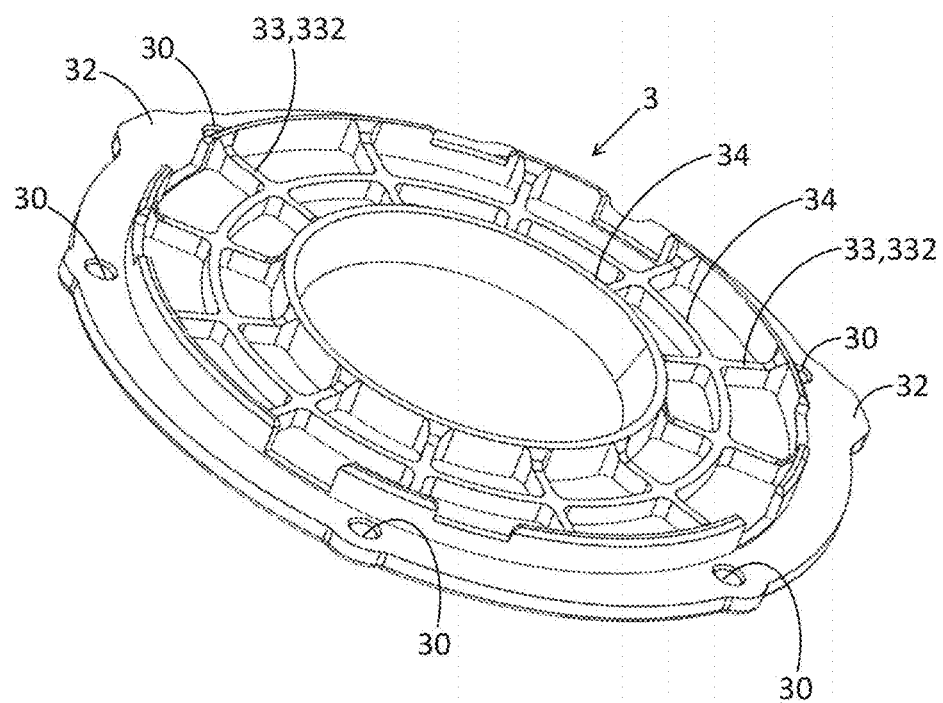
FIG. 6 is a perspective view of a motor cover according to an example embodiment of the present disclosure with a reverse surface facing upward.
Figure 7:
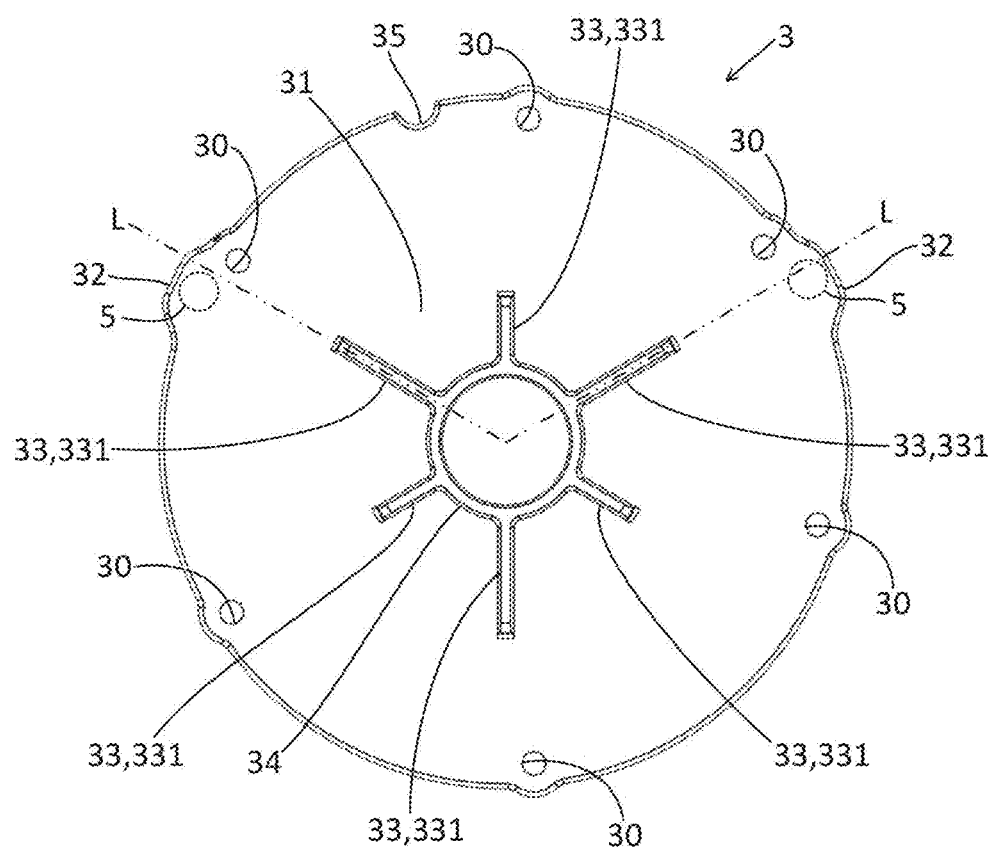
FIG. 7 is a plan view of a motor cover according to an example embodiment of the present disclosure as viewed from above.
Figure 8:
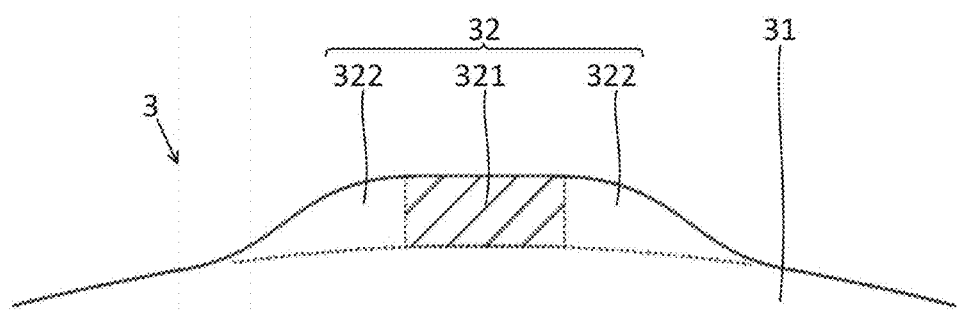
FIG. 8 is a view schematically illustrating a protruding portion of a motor cover and its periphery according to an example embodiment of the present disclosure.
Figure 9:
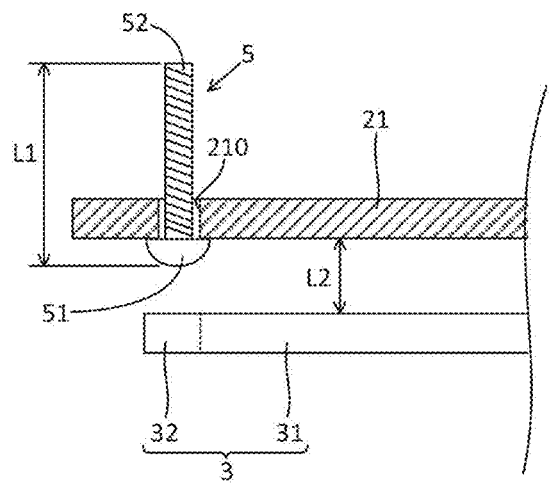
FIG. 9 is a view schematically illustrating the positional relationship between a screw inserted into the control board and the motor cover according to an example embodiment of the present disclosure.
Figure 10:
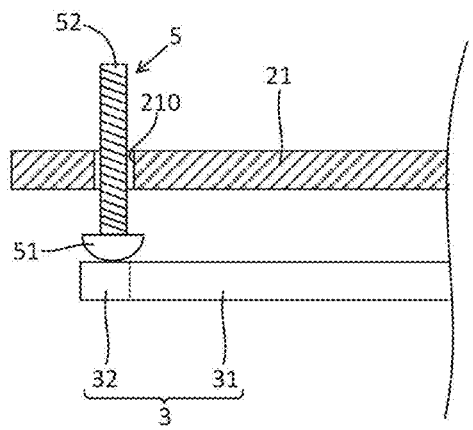
FIG. 10 is a view illustrating a state in which a screw illustrated in FIG. 9 has moved downward.

FIG. 5 is a perspective view of the motor cover 3 according to the example embodiment as viewed from above. FIG. 6 is a perspective view of the motor cover 3 according to the example embodiment with the reverse surface facing upward. FIG. 7 is a plan view of the motor cover 3 according to the example embodiment as viewed from above. Referring to FIG. 7, portions overlapping the screws 5 in the axial direction are indicated by the broken lines to clarify the positional relationship between the motor cover 3 and the screws 5. FIG. 8 is a view schematically illustrating a protruding portion 32 of the motor cover 3 and its periphery according to the example embodiment. FIG. 9 is a schematic view illustrating the axial positional relationship between the screw 5 inserted into the control board 21 and the motor cover 3. FIG. 10 is a view illustrating a state in which the screw 5 illustrated in FIG. 9 has moved downward. Referring to FIGS. 9 and 10, the left-right direction in each drawing is the radial direction, the left side in each drawing corresponds to the radially outside, and the right side in each drawing corresponds to the radially inside.

The motor cover 3 is a plate-like member. The motor cover 3 includes a main body portion 31. The main body portion 31 is formed in a circular shape centered on the central axis CA. The motor cover 3 has a hole portion 30 penetrating in the axial direction. The number of hole portions 30 is the same as the number of pins 130 of the bus bar unit 13. The arrangement position of the hole portion 30 overlaps the pin 130 in the axial direction. The pin 130 is inserted into the hole portion 30. That is, the motor cover 3 has the hole portion 30 into which the pin 130 is inserted.

The motor cover 3 is welded to the bus bar holder 131 in a state in which the pin 130 is inserted into the hole portion 30. However, the present invention is not limited to this. For example, the pin 130 may be a male screw. A male screw as the pin 130 may be inserted into the hole portion 30 from the upper side of the motor cover 3 and screwed into the bus bar holder 131. For example, the motor cover 3 may be fixed to the bus bar holder 131 by providing a hook at the distal end of the pin 130 and inserting the pin 130 into the hole portion 30. That is, the motor cover 3 may be fixed to the bus bar holder 131 by a snap-fit method.

In this case, the motor cover 3 faces the head portion 51 of the screw 5 in the axial direction. For example, of the four screws 5, the head portions 51 of the two screws 5 face the motor cover 3 in the axial direction. An axial length L1 (see FIG. 9) of the screw 5 is longer than a distance L2 (see FIG. 9) between the control board 21 and the motor cover 3 in the axial direction. That is, the axial length of the screw 5 is longer than the distance between the controller 2 and the motor cover 3 in the axial direction. The axial length of the screw 5 is the length from the lower end (the end on the other side in the axial direction) of the head portion 51 to the upper end (the end on one side in the axial direction) of the screw portion 52 of the screw 5.

The screw 5 is disposed at a position shifted from the hole portion 30 of the motor cover 3 when viewed from the axial direction. Accordingly, when the screw 5 is loosened and moves downward, the head portion 51 of the screw 5 can be brought into contact with the motor cover 3. FIG. 10 illustrates a state in which the screw 5 has moved downward. At this time, since the axial length of the screw 5 is longer than the distance between the control board 21 and the motor cover 3 in the axial direction, the screw 5 does not fall off, and the threadable engagement of the screw 5 with the attachment portion 430 can be suppressed from being completely released.

As a result, it is possible to suppress the generation of vibration in the control board 21.

For example, the screw 5 protrudes radially outward from the main body portion 31 of the motor cover 3 when viewed from the axial direction. When viewed from the axial direction, the entire portion of the screw 5 may be disposed radially outside the main body portion 31 of the motor cover 3.

Accordingly, the motor cover 3 has the protruding portion 32 that protrudes radially outward from the main body portion 31. The protruding portion 32 faces the head portion 51 of the screw 5 in the axial direction. Accordingly, when the screw 5 is loosened and moves downward, the head portion 51 of the screw 5 can be reliably brought into contact with the motor cover 3.

Further, the width of the protruding portion 32 in the circumferential direction is larger than the diameter of the head portion 51 of the screw 5. In other words, the protruding portion 32 has a first portion 321 overlapping the head portion 51 of the screw 5 and a second portion 322 extending from the first portion 321 to both sides in the circumferential direction when viewed from the axial direction. Referring to FIG. 9, the first portion 321 is hatched to be discriminated from the second portion 322. Referring to FIG. 8, the left-right direction in the drawing corresponds to the circumferential direction.

Since the protruding portion 32 has the second portion 322, when the screw 5 is loosened and moves downward, the head portion 51 of the screw 5 can be brought into contact with the motor cover 3 even if the positional relationship between the motor cover 3 and the screw 5 is changed by an assembly error or the like. For example, even if the position of the screw 5 when viewed from the axial direction is shifted in the circumferential direction with respect to the first portion 321, the head portion 51 of the screw 5 can be brought into contact with the second portion 322.

The motor cover 3 has a rib 33. The rib 33 protrudes in the axial direction and extends in the radial direction. More specifically, the plurality of ribs 33 radially extend from the central portion in the radial direction. Each of the plurality of ribs 33 extends linearly in the radial direction.

The protruding portion 32 is disposed ahead in the direction in which one of the ribs 33 extends. That is, the protruding portion 32 is on a line extending in the same direction as the rib 33 when viewed from the axial direction. This can suppress the vibration of the motor cover 3. The rib 33 may be formed to extend to the protruding portion 32. Referring to FIG. 7, a line extending in the same direction as the rib 33 is indicated by the two-dot chain line, and a reference sign L is given.

In addition, the motor cover 3 includes, as the ribs 33, obverse surface ribs 331 protruding upward (to one side in the axial direction) from the upper surface and reverse surface ribs 332 protruding downward (to the other side in the axial direction) from the reverse surface opposite to the obverse surface. As a result, the vibration of the motor cover 3 can be further suppressed as compared with the case in which the rib 33 is formed only on one surface of the motor cover 3.

For example, the motor cover 3 further includes annular ribs 34. The annular ribs 34 are provided on both surfaces, namely, the obverse surface and the reverse surface. The annular rib 34 has an annular shape centered on the central axis CA when viewed from the axial direction. The ribs 33 extend radially outward from the annular ribs 34 as viewed in the axial direction. Note that the number of annular ribs 34 on the surface is one (see FIG. 5). On the other hand, a plurality of annular ribs 34 are formed on the reverse surface (see FIG. 6).

The motor cover 3 is made of a resin. For example, the motor cover 3 is a resin molded product. Accordingly, the motor cover 3 having the protruding portion 32 can be easily formed. In addition, the ribs 33 can be easily provided on the obverse and reverse surfaces of the motor cover 3.

The motor cover 3 has a mark 35 for suppressing the occurrence of work mistakes in the attaching process with respect to the bus bar unit 13. The mark 35 is a notch cut radially inward from the outer edge of the motor cover 3. Providing the mark 35 on the motor cover 3 can prevent the motor cover 3 from being attached at a circumferential position shifted from the correct position in the attaching process for the motor cover 3.

The example embodiment of the present invention is described as above. Note that the scope of the present invention is not limited to the above-described example embodiment. The present invention can be implemented with various modifications within a scope not departing from the gist of the invention. Further, the above-described example embodiment can be appropriately and optionally combined.

The present invention can be applied to, for example, an electric power steering device used for assisting steering wheel operation of a vehicle such as an automobile.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor assembly comprising:
   a motor including a rotor rotatable about a central axis and a stator radially opposing the rotor;
   a controller on one side in an axial direction of the motor to control the motor; and
   a motor cover between the motor and the controller in the axial direction and covering the motor from the one side in the axial direction; wherein
   the controller includes a screw;
   the screw includes:
      a head portion located on the one side in the axial direction of the motor cover; and
      a screw portion extending from the head portion to the one side in the axial direction;
   the motor cover opposes the head portion in the axial direction;
   a length of the screw in the axial direction is longer than a distance between the controller and the motor cover in the axial direction;
   the motor includes a pin extending to the one side in the axial direction;
   the motor cover includes a hole portion into which the pin is inserted; and
   the screw is at a position shifted from the hole portion as viewed in the axial direction.

2. The motor assembly according to claim 1, wherein the motor cover includes:
   a main body portion, and
   a protruding portion that protrudes radially outward from the main body portion; and
   the protruding portion axially opposes the head portion.

3. The motor assembly according to claim 2, wherein a circumferential width of the protruding portion is larger than a diameter of the head portion as viewed in the axial direction.

4. The motor assembly according to claim 2, wherein
   the motor cover includes a rib protruding in the axial direction and extending in a radial direction; and
   the protruding portion is on a line extending in the same direction as the rib when viewed from the axial direction.

5. The motor assembly according to claim 4, wherein the rib of the motor cover includes an obverse surface rib protruding from an obverse surface on the one side in the axial direction to the one side in the axial direction and a reverse surface rib protruding from a reverse surface opposite to the obverse surface to the other side in the axial direction.

6. The motor assembly according to claim 1, wherein the motor cover is made of a resin.

\* \* \* \* \*